(12) United States Patent
Bell

(10) Patent No.: US 7,856,361 B1
(45) Date of Patent: Dec. 21, 2010

(54) LIFENET

(76) Inventor: Yvonne F. Bell, 34 Buchanan La., Streamwood, IL (US) 60107

( * ) Notice: Subject to any disclaimer, the term of this patent is extended or adjusted under 35 U.S.C. 154(b) by 1843 days.

(21) Appl. No.: 09/774,807

(22) Filed: Feb. 1, 2001

(51) Int. Cl.
G06Q 10/00 (2006.01)
G06Q 50/00 (2006.01)

(52) U.S. Cl. .................................. 705/2; 705/3; 705/4

(58) Field of Classification Search ................ 705/2–4, 705/35
See application file for complete search history.

(56) References Cited

U.S. PATENT DOCUMENTS

| | | | |
|---|---|---|---|
| 4,916,611 A | 4/1990 | Doyle, Jr. et al. | 705/2 |
| 5,235,507 A | 8/1993 | Sackler et al. | 705/2 |
| 5,241,466 A | 8/1993 | Perry et al. | 705/1 |
| 5,651,117 A | 7/1997 | Arbuckle | 705/4 |
| 5,732,231 A * | 3/1998 | Evans, III | 715/716 |
| 7,305,347 B1 * | 12/2007 | Joao | 705/1 |
| 2002/0128844 A1 * | 9/2002 | Wilson et al. | 704/270 |
| 2003/0009418 A1 * | 1/2003 | Green et al. | 705/38 |

OTHER PUBLICATIONS

PR Newswire, New York State Relies on Sybase to Simplify and Streamline Processing of Death Certificates, Sep. 1998.*

* cited by examiner

*Primary Examiner*—Luke Gilligan
(74) *Attorney, Agent, or Firm*—John Marshall Law School & Patent Clinic; William J. Hallihan

(57) ABSTRACT

A computer network system which links one or more life insurances, a selected funeral home, hospitals and the Social Security Administration to notify all concerned entities when a death has occurred. A hospital death notice is posted and automatically sent to a selected funeral home director who then notifies, the appropriate life insurance companies, Social Security Administration, pension providers and other concerned entities.

5 Claims, 3 Drawing Sheets

LIFENET

BACKGROUND OF THE INVENTION

This invention relates to a computer network system that links entities to notify them when a death occurs.

In the past notification that a death has occurred was accomplished by sending one or more copies of the death certificate to all interested parties such as insurance companies, funeral homes, hospitals and the Social Security Administration. This death certificate was commonly issued by the local entity charged with the responsibility for doing so such as the Office of Public record in the jurisdiction where the death occurred. The heirs or the administrator of the descendants estate would then send one or more copies of this certificate to the entities. Needless to say this is a time consuming process that can result in errors and delays at a time when prompt and accurate action is required.

To expedite the notification processes computers and computer programs have been used. For example, in one such invention a computerized insurance claim processing system is disclosed. In another earlier invention, a data processing system for health insurance management is disclosed which verifies the insurance status of the claimant.

Another prior art system discloses a central depository for secure storage and rapid retrieval of documents such as wills.

Still another system is disclosed for disseminating obituaries by a depository that monitors reports of death and selectively transmits them to the appropriate agencies.

DESCRIPTION OF THE PRIOR ART

Systems that retrieve or disseminate, or both, information are disclosed in the known in the prior art. For example, U.S. Pat. No. 4,915,611 to Doyle, Jr. et al. a computerized insurance claim processing system is disclosed.

U.S. Pat. No. 5,235,507 to Sackler et al. a data processing system for health insurance management is disclosed which verifies the insurance status of the claimant.

U.S. Pat. No. 5,241,466 to Perry et al. discloses a central depository for secure storage and rapid retrieval of documents such as wills.

U.S. Pat. No. 5,651,117 to Arbuckle discloses a system for disseminating obituaries by a depository that monitors reports of death and selectively transmits them to the appropriate agencies.

In the present invention a computer network system links life insurances, funeral homes, hospitals and the Social Security Administration to notify all entities when a death has occurred. A hospital death notice is posted and automatically sent to a selected funeral home director who then communicates with the appropriate life insurance companies, the Social Security Administration and other concerned entities all as will be detailed in the specification that follows hereafter.

SUMMARY OF THE INVENTION

This invention relates to a computer network system which links one or more life insurances, a selected funeral home, hospitals and the Social Security Administration to notify all concerned entities when a death has occurred. A hospital death notice is posted and automatically sent to a selected funeral home director who then notifies, the appropriate life insurance company ( ) Social Security Administration, pension provides and other concerned entities.

It is the primary object of the present invention to provide for an improved computer based system which links and notifies concerned entities when a death occurs.

Another object is to provide for such a system in a death notice is first posted and then automatically sent by a selected funeral director to, one or more insurance companies, the Social Security Administration and other concerned entities.

These and other objects and advantages of the present invention will become apparent to readers from a consideration of the ensuing description and the accompanying drawings.

DESCRIPTION OF THE PREFERRED EMBODIMENT

Figure 1:
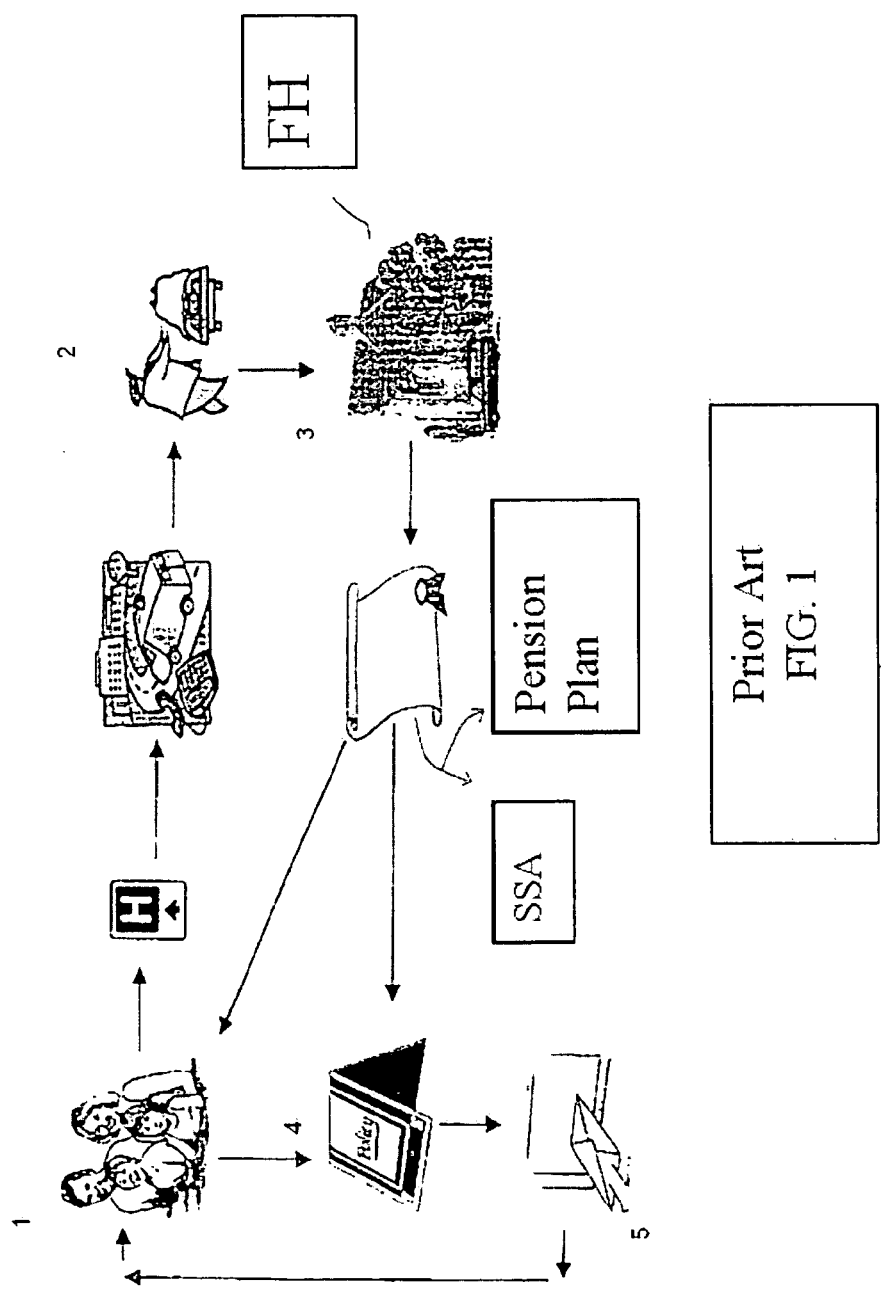
FIG. 1 is a flow diagram indicating typical prior art process steps and entities involved in the notification process when a death occurs.

FIG. 1 is a flow diagram indicating the typical current process steps and entities involved in the notification process when a death occurs. In step 1*a* loved one of a family becomes ill and is sent to a hospital H. Next, in step 2 death occurs and the body is sent to the funeral home (FH). The funeral home receives a death certificate from the hospital and in step 3 provides for the filing and distribution of the copies to the family of the decedent. Associated with step 3 would be the arrangement of a memorial service and burial arrangements with the funeral home or funeral home director including the payment of fees for these services. After step 3 in step 4, the family members would contact any insurance or insurance companies, like life insurance companies, and provide them with the name, date of death, date of birth, policy number (s), and, if available, the social security number of the decedent. If any social security benefits are to be paid (i.e., funeral expenses) or are to be changed or cease being paid (like monthly benefits) notification would also be made to the Social Security Administration (SSA) in this step 4. Appropriate document and death certificate sent for verification purposes would also be sent to the SSA. Any pension supplier may also be notified in the same step with instruction to stop or adjust the decent dent's pension benefits as is appropriate.

Typically, a notified life insurance company would initiate a claim and send the beneficiary a compensation check in accordance with their contract provisions which would then be received by the beneficiaries (step 5) in about 6 to 8 weeks after submission. Clearly, this type of process to notify concerned entities about the death of a person and to receive or cease/deduce) any pension or other benefits is a time consuming process with the possibility of delays and errors ever present.

Figure 2:
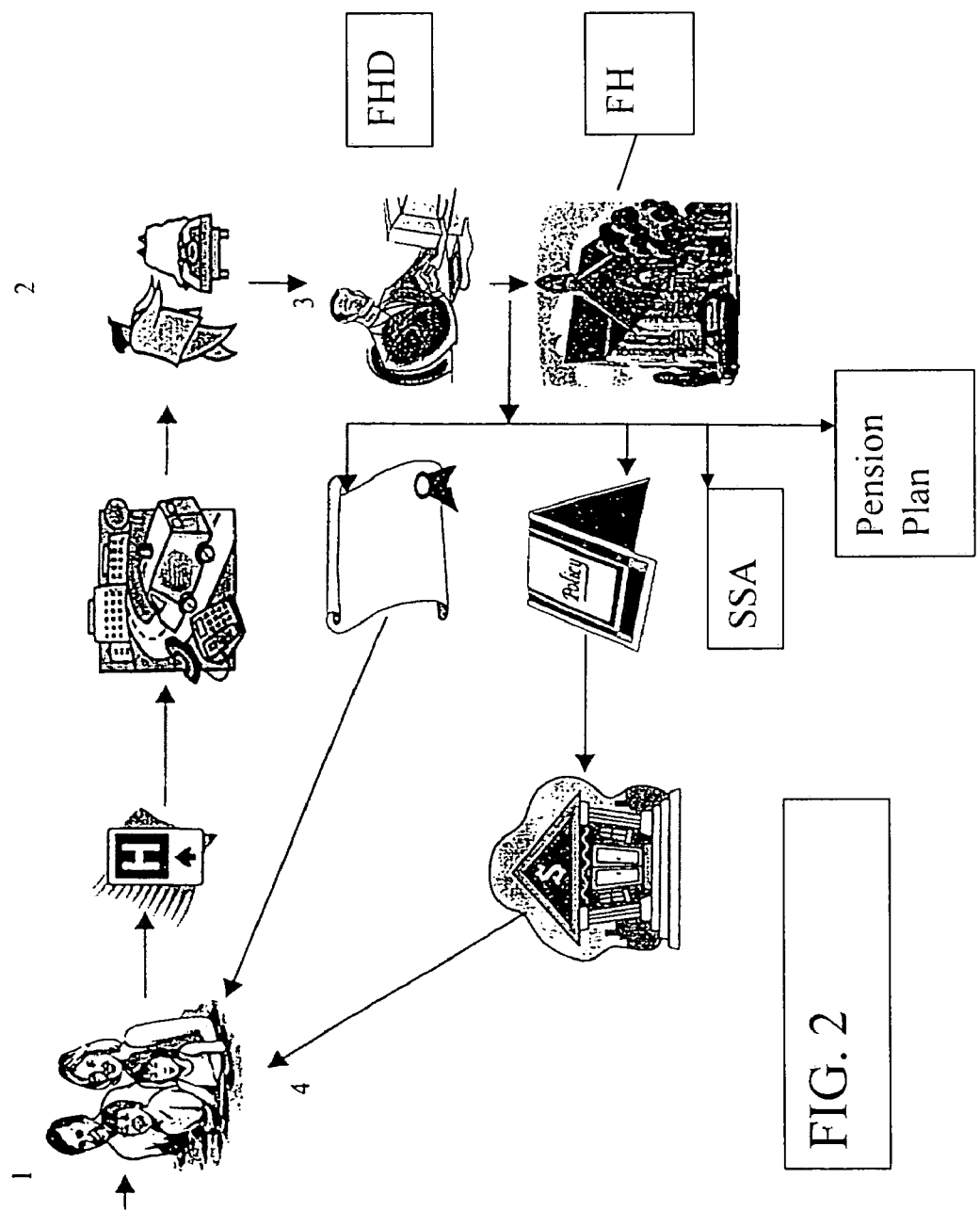
FIG. 2 is a flow diagram indicating some of the steps and entities involved in the notification process when death occurs practicing the current invention.

FIG. 2 is a flow diagram indicating some of the steps and entities involved in the notification process when death occurs practicing the current invention referred to as Lifenet. As before, in step 1, a family member becomes ill and is sent to a hospital. In step 2, as before, the loved one passes away. In step 3, the body is sent to a selected funeral home. Here, a death certificate is received from the hospital and the funeral home or funeral home director (FHD), these terms are used interchangeably in this application, provides for its filing and distribution to concerned entities with copies to the family. As before, the family members arrange for a memorial service and burial arrangements with the funeral home director including payment arrangements.

The FHD enters vital statistics about the decedent into the computer network system termed Lifenet along with beneficiary supplied bank information, insurance company information, SSA information and any other pertinent information including pension information. This submitted information is then transmitted to these preselected entities results in the processing by the insurance company, e.g., which initiates a claim process and then provides an E-Commerce based transaction set to transmit electronically through federal accepted standards and guidelines for banking transactions and placed in a deposit account for the beneficiary in step 4. Typically, the compensation from a life insurance company would be deposited to the credit of the beneficiary is about 2-3 weeks after notification.

Figure 3:
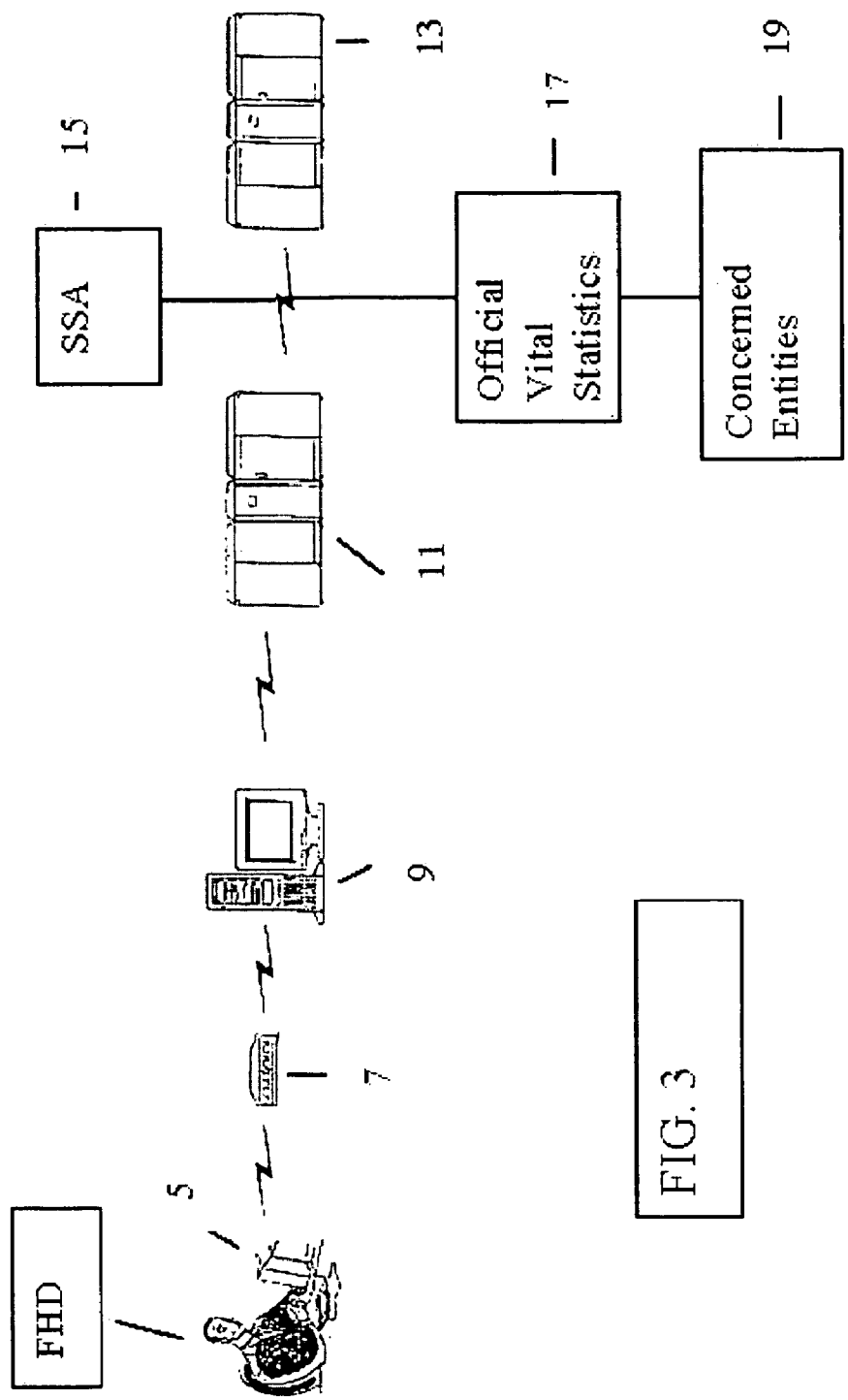
FIG. 3 is a schematic diagram indicating some of the hardware used to transmit the death notification notice sent to the entities in FIG. 2.

FIG. 3 is a schematic diagram indicating some of the hardware used to transmit the death notification notice sent to the entities in FIG. 2. All hardware shown is conventional and state of the art and digital signals are transmitted to the entities indicated. The FHD has a comprehensive set of computer programs loaded into his or her personal computer 5 which provides a menu approach for entry of appropriate relevant data about the decedent. The programs can be modified as needed and would include the current conventional technology available. Such programs would be designed to run in a multi-platform environment.

Data from the PC would be transmitted digitally via a modem 7 or direct line connection to an IBM compatible server unit 9 which then contacts the mainframe computers of the entities to be contacted, such as the Insurance Company 11, the Bank 13, the SSA 15, government agencies concerned with vital statistics 17, and any other concerned entities 19, like pension plans. The transmitted data will be sent through a secured encrypted line hookup and each contacted entity will have the necessary mainframe computer hardware and software to permit the decoding of the transmitted information.

Clearly, the present invention relates to the following related functions and entities:

1. Development of a training program and financing package for hardware and software marketed to funeral home as a turn-key package;

2. Increase of funeral homes established using this present invention;

3. Development of a training relationship with Mortician Trade Schools to enable new graduate(s) with up to date technology usage in the marketplace.

4. Increase in the number of Life Insurance companies connected to the services as providers of this service for their policy holders;

5. Exploration with government agencies for a contract whose purpose is to establish the link for automatic notification of death and the changing of any possible benefits (e.g., Social Security, railroad retirement, or other pension, retirement, 401(K) or other plans) payable to the descendants estate or heirs. This type of link would decrease the fraudulent use of Social Security and other benefits; and 6. Exploration with the many local and national agencies charged with keeping vital statistics (see FIG. 3) to provide for more accurate data for census and fraud deduction activities on the local and national level. The U.S. Bureau of the Census and other data collection entities would be tied in with the death notices supplied at the national level. In fact, any entities concerned with the notice that a person has died could be linked to the system.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A computer-network system used to inform concerned entities that a person has died comprising:
   a patient care facility notification center which transmits a death notice, via a computer network, to a funeral home informing the funeral home of the death of the patient;
   a funeral home to receive the death notice from the patient care facility notification center, said funeral home being linked by a computer network to concerned entities;
   said concerned entities being linked to said computer network of the funeral home to receive the death notice;
   said concerned entities including an insurance company having a policy on the patient who has died and the Social Security Administration;
   said insurance company generating a compensation by processing the policy, on the patient who has died, based on the received death notice;
   and a beneficiary deposit account wherein the compensation is deposited into the, beneficiary deposit account after the processing of the policy at the insurance company.

2. The computer network system as claimed in claim 1, wherein said concerned entities linked to the computer network and the funeral home also include a government entity charged with maintaining vital statistics within a community including deaths.

3. The computer network as claimed in claim 2 wherein said patient care facility notification center is linked to said funeral home by a digital transmitting medium and hardware capable of transmitting a digital signal from the patient care facility notification center which can be received by the funeral home.

4. The computer network system as claimed in claim 3, also including a pension plan administration office linked to said funeral home through the computer network to receive and transmit digital signals.

5. A computer network based method to transmit death notices to concerned entities comprising the steps of:
   a) providing a computer network system implemented on a computer network to inform concerned entities that a person has died wherein the computer network system transmits a death notice from a patient care facility via the computer network to a funeral home;
   b) the funeral home transmitting via the computer network system the death notice to concerned entities linked to the funeral home through the computer network including an insurance company and the Social Security Administration;
   c) said insurance company that receives said death notice from the funeral home retaining data contained in said death notice and acting on said data to provide compensation due to a beneficiary of the patient covered by the death notice; and
   d) transmitting the compensation due to the beneficiary to the beneficiary's deposit account via the computer network system through the computer network.

* * * * *